Figure 4:
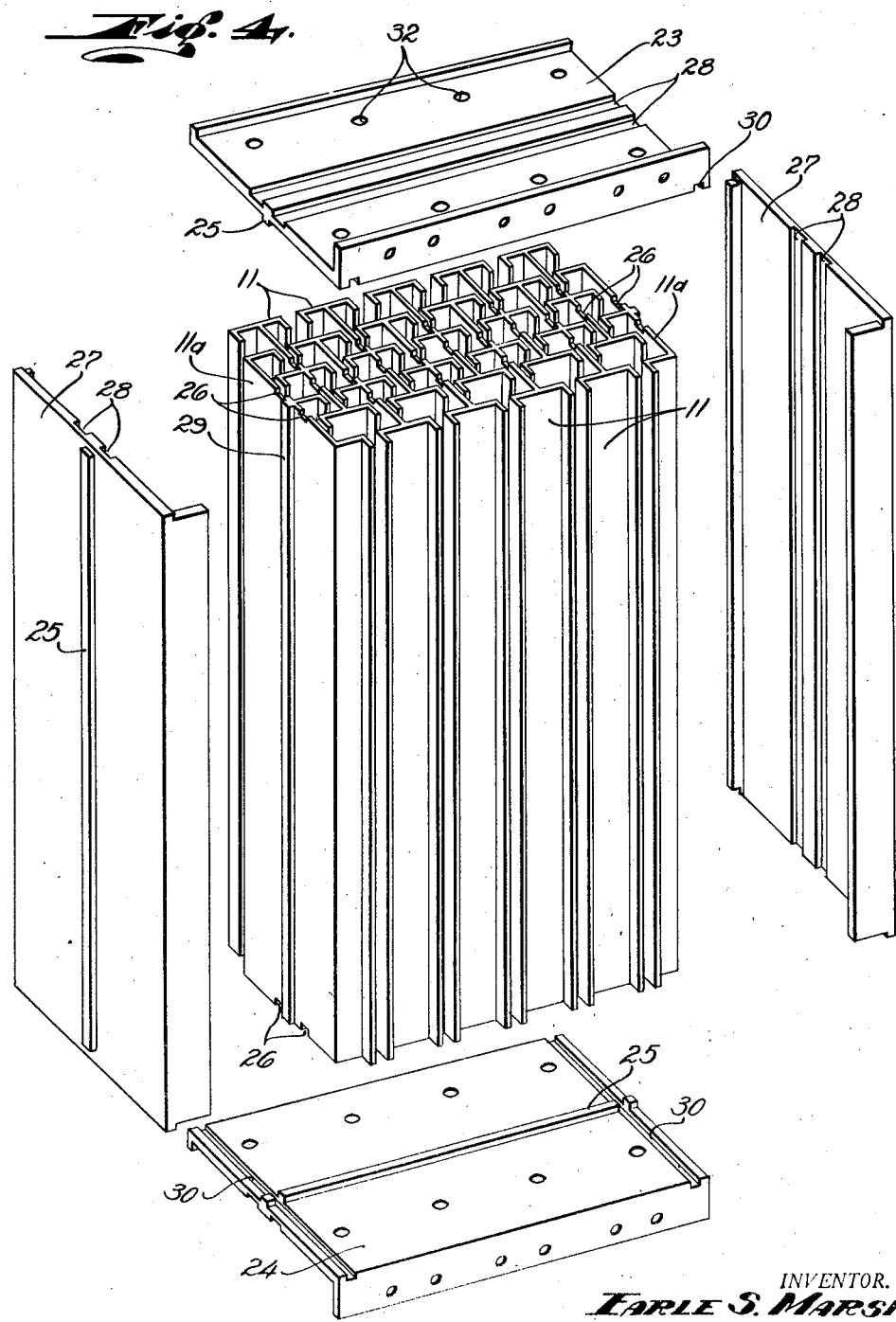

June 28, 1949.  E. S. MARSH  2,474,540
GAS SEPARATOR
Filed Feb. 9, 1946  2 Sheets-Sheet 1
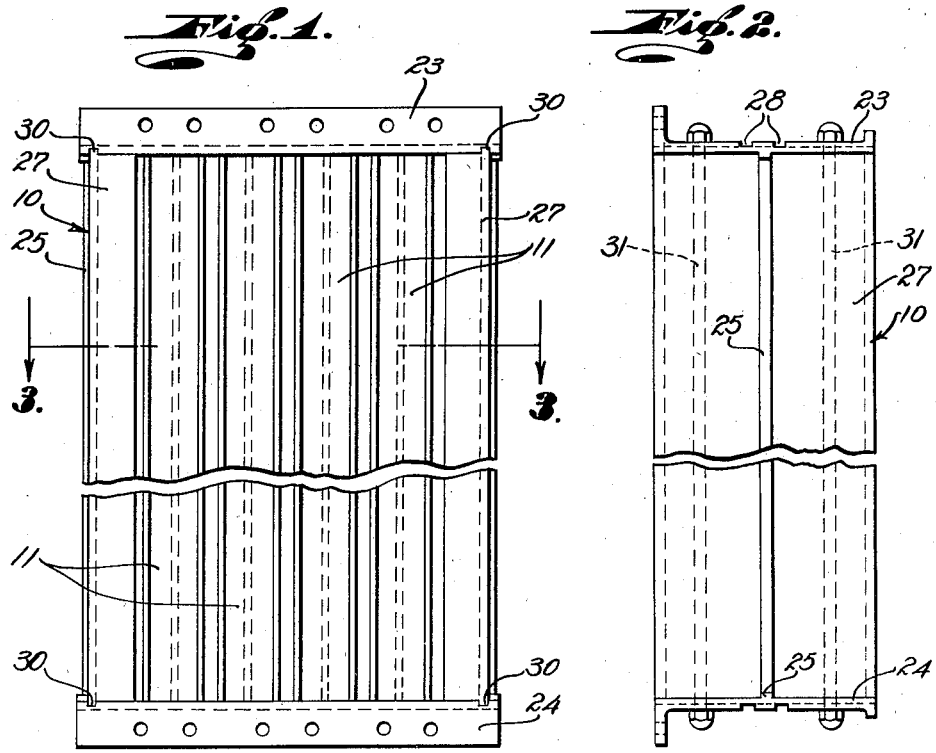
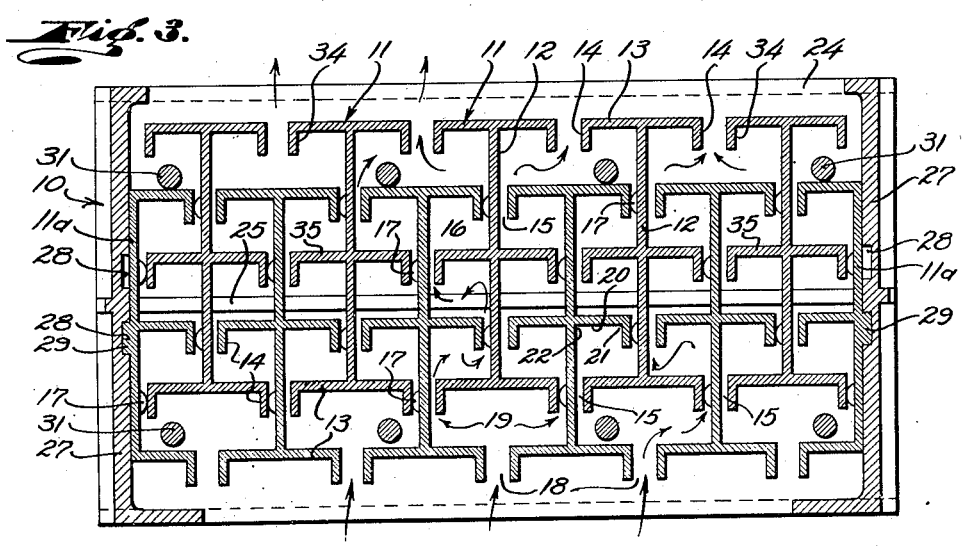
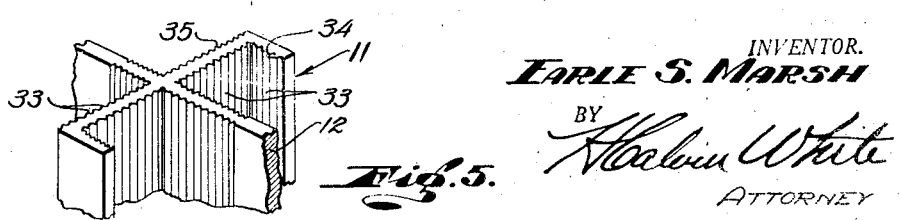
INVENTOR.
EARLE S. MARSH
BY
Halvin White
ATTORNEY June 28, 1949.　　　E. S. MARSH　　　2,474,540
GAS SEPARATOR Filed Feb. 9, 1946　　　2 Sheets-Sheet 2

INVENTOR.
EARLE S. MARSH
BY
ATTORNEY

Patented June 28, 1949

2,474,540

UNITED STATES PATENT OFFICE 2,474,540

GAS SEPARATOR

Earle S. Marsh, Temple City, Calif., assignor to The Fluor Corporation, Ltd., Los Angeles, Calif., a corporation of California Application February 9, 1946, Serial No. 646,664

3 Claims. (Cl. 183—110)

This invention has to do with gas separators or scrubbers, and has for its general objects to provide an improved form of separator, whereby it is possible to obtain maximum entrainment removal using a novel form of unit characterized by its separating efficiency, structural practicability and resistance to attack by corrosive or chemically active gases. More particularly, the invention relates to improvements in separators of the multiple baffle type, and in which the form and arrangement of the baffles subjects the gas to multiple direction flow at changing velocities and to impingement against liquid-removing surfaces of the baffles.

One major object of the invention is to make important improvements in the composition, surface condition and manufacture of the individual baffles. In this connection it may be mentioned that broadly considered, the invention is not to be regarded as limited to the formation or use of baffles having any particular form or arrangement, although for purposes of description, reference is had hereinafter to a particular baffle shape and arrangement that has given highly satisfactory results.

The invention departs from the conventional type of separator by forming the baffles of metals particularly resistant to attack and disintegration by such agents as the acidic or alkaline constituents of corrosive gases. Preferred metals are aluminum or aluminum alloys where acid gases are encountered, and brass alloy compositions where the baffles are to resist attack by alkaline gases. A particular feature is the formation of the baffle elements by extrusion of the metal, and the formation in the baffle surfaces of irregularities which materially increase the effective surface area of the baffle, and therefore its capacity to retain liquid. One method of so increasing the baffle surface area is to form, in the extrusion process, irregularities in the form of closely arranged grooves or recesses extending in the direction of the extrusion. It is also contemplated that the baffle surface area may be further increased by the formation of more localized irregularities, as by sand-blasting, the combination of the extrusion-formed grooves and pitted surface resulting from sand-blasing, giving the baffle a total surface area increased to a degree that it becomes highly retentive of liquid deposited on it.

Of particular importance is the use of aluminum or aluminum alloys as the baffle-forming material in separators for such fluids as natural gas. As a means of increasing the normal resistance of the aluminum base baffle to corrosion or attack, and to present an abnormally hard surface, the baffle may be surface hardened by any of the customary methods employed for aluminum and its alloys. As will be understood, when anodized, the baffle surface becomes hardened to a degree effectively resisting physical wear or erosion by high velocity gases, and attack or chemical reaction with corrosive constituents of the gas.

A further object of the invention is to provide improvements in means for maintaining the baffles in accurately spaced relation, and a plate arrangement for retaining the baffles as a unit capable of easy assembly and disassembly.

All the aforementioned features and objects will be understood to better advantage from the following description of the accompanying drawings illustrative of the invention in a typical and preferred form. In the drawings:

Fig. 1 is a front elevation of the baffle unit;
Fig. 2 is a side view of Fig. 1;
Fig. 3 is an enlarged cross-section on line 3—3 of Fig. 1;
Fig. 4 is a perspective exploded view illustrating the arrangment and interfitting relationship of the baffles and retaining plates; and
Fig. 5 is a fragmentary view showing the surface irregularities in the baffle.

The drawings show a unitized assembly of the baffle elements and retaining plates, which as will be understood, may be installed in a suitable form of shell or vessel through which a gas is passed for liquid extraction by the baffle unit. Various structural arrangements of baffle units within shells or pressure vessels are well-known, and hence require no specific description or illustration.

The separator unit, generally indicated at 10, comprises an assembly of individual baffles 11 which in the broad aspects of the invention may have any of various specific shapes requiring the gas passing through the assembly, to be subjected to tortuous or multi-directional flow, and to impingement against the baffle surfaces to effect precipitation of liquid entrainment which deposits on and drains from the baffles. Typically, the individual baffles 11 are shown to have central web portions 12 extending in the general direction of the gas flow indicated by the arrows, and transverse portions 13 having end flanges 14 turned against the direction of gas flow, to form as integral parts of each web 12, a plurality of uniformly spaced T-shaped heads. As illustrated, these T-heads are arranged in offset relation and are spaced at 15 from the adjacent webs 12 to form relatively narrow gas passages of small cross-sectional area as compared with the transverse area of the spaces 16 between the webs. Accurately uniform and predetermined spacings are maintained at 15 by forming on the webs 12, projections or nodules 17 engaged against certain of the flanges 14. Thus when assembled, the individual baffles are brought together transversely to bring all the projections 17 into engagement with the adjacent flanges 14, so that uniformity of spacing, and therefore of gas flow between the baffles, exists throughout the entire assembly.

As indicated by the arrows, the gas entering spaces 18 and 19 flows through the restricted spaces 15 to be projected at high velocity against the surfaces 20 of the baffle heads, the high velocity gas impingement against the surfaces tending to cause liquid particles, by virtue of their greater inertia, to deposit on the surfaces and collect in the corners 21 and 22, thence to drain to the bottom of the baffles. After impingement against surfaces 20, the gas streams reverse their direction of flow in passing to the next series of openings 15, and the described effects are continued as the gas flow progresses through the unit. The entrainment removing efficiency of the baffle arrangement is such that upon leaving the unit the gas will be substantially completely free of liquid particles.

Referring to Fig. 4, the baffle assembly is interlocked, top and bottom and also at the sides, between retaining plates 23 and 24 to produce a unit characterized by its ease of assembly and disassembly, and adaptability for installation in a separator shell or vessel. The baffle engaging surfaces of the plates 23 each has formed thereon a rib 25 to be received within the alined notches 26 in the top and bottom edges of the baffles, to hold the baffles in fixed relation against movement in the direction of the webs 12. The baffle assembly is confined at the sides by plates 27 each containing a pair of grooves 28 within one of which is received the tongue or rib 29 on the outside baffles 11a. When an uneven number of the baffles 11 are contained between the side baffles 11a, ribs 29 will be received within the forward recesses 28 as viewed in Fig. 3, and when the intervening baffles 11 are even in number, ribs 29 will be received within the rear recesses 28 and another set of the notches 26 in the ends of the baffles, brought into alinement to receive the ribs 25. The top and bottom edges of plates 27 are received within grooves 30 in the baffle engaging faces of plates 23. Thus reception of the side plates within grooves 30 interlocks the assembly laterally. Vertical interlocking is accomplished by tie bolts 31 extending between the baffles as illustrated in Fig. 3, and through holes 32 in plates 23.

The baffles 11 and 11a are formed as extrusions, i. e. the metal is extruded through dies to form the baffles in the shapes illustrated. Likewise it is found advantageous to form the retaining plates 23 and 27 by extrusion of metal having the same composition as the baffles. Since it may be economical to cut all the retaining plates from the same extruded strip material or stock, all the plates are shown to have the same cross-sectional configuration, it being understood that for the purposes of plates 27, the ribs 25 have no function, and no functional purpose is served by the recesses 28 in plates 23.

As previously indicated, the baffles 11 and 11a are provided with surface irregularities, formed either or both in the extrusion operation and by sand-blasting. As illustrated in Fig. 5, the baffle surfaces have small grooves 33, preferably edge-to-edge, extending longitudinally of the baffle and formed in its surface as the baffle metal is extruded through the die. Typically, the grooves 33 may be V-shaped in cross-section and individually about $\frac{1}{32}$ inch in width. The resulting irregularization of the baffle surface considerably increases its area and the capacity of the surface to retain moisture deposited on it. Preferably, all surfaces of the baffles (including the inside of the flange surfaces 34) against which the gas is impinged, and including the back surfaces 35 and the surfaces of the webs 12, except at the recesses 15, are irregularized by the described closely spaced, longitudinal grooves.

By sand-blasting all surfaces of the baffles, the effective areas of the surfaces are further and materially increased to bring the total area in correspondence with the increases effected by both the grooves and localized depressions or pitted areas formed by the sand-blasting. Tests have demonstrated a marked tendency for deposited liquid particles to film the surfaces so prepared, and to be effectively retained against tendency for re-entrainment into the gas stream.

Finally, where the baffles are formed for example of aluminum, or an alloy susceptible of surface hardening, for maximum resistance to attack by corrosive gases the extruded baffles and plates may be anodized or alumilited by any of the known methods to give the baffles and plates locally hardened surfaces highly resistant to fluid erosion and chemical attack.

I claim:

1. A gas separator comprising a plurality of individual vertically extending baffles nested in side by side relationship to present a pair of outer baffles with the others retained therebetween, a pair of spaced vertical side plates disposed adjacent and parallel to the outer of said baffles and engaging said outer baffles to thereby retain all of the baffles in side by side interfitting relation, a pair of spaced horizontal top and bottom plates for vertically retaining said baffles, spaced grooves in each of said top and bottom plates for the reception of the upper and lower extremities of said side plates to retain said side plates in their assembled positions, and projections on said baffles for maintaining them in horizontally spaced positions to permit passage of gas therebetween.

2. A gas separator comprising a plurality of individual vertically extending baffles nested in side by side relationship to present a pair of outer baffles with the others retained therebetween, a pair of spaced vertical side plates disposed adjacent and parallel to the outer of said baffles to retain the baffles in side by side interfitting relation, a pair of spaced horizontal top and bottom plates for vertically retaining said baffles, transversely aligned notches in the upper and lower ends of said baffles, a transverse rib across each of said top and bottom plates to engage said notches and prevent horizontal displacement of said baffles, and projections on said baffles for maintaining them in horizontally spaced positions to permit passage of gas therebetween.

3. A gas separator comprising a plurality of individual vertically extending baffles nested in side by side relationship to present a pair of outer baffles with the others retained therebetween, a pair of spaced vertical side plates disposed adjacent the outer two of said baffles and parallel thereto to retain all of said baffles in side by side interfitting relation, a vertical rib on the outer surface of each of the said outer baffles, a vertical groove in the inner surface of each side plate to engage the rib of the adjacent baffle, a pair of spaced horizontal top and bottom plates for vertically retaining said baffles, spaced grooves in each of said top and bottom plates for the reception of the upper and lower extremities of said side plates to retain said side plates in their assembled positions, transversely aligned notches in the upper and lower ends of said baffles, a transverse rib across each of said top and bottom plates to engage said notches and prevent horizontal displacement of said baffles, and tie bolts interconnecting the top and bottom plates to lock all the plates and baffles in assembled relation.

EARLE S. MARSH.

REFERENCES CITED

The following references are of record in the file of this patent:

UNITED STATES PATENTS

| Number | Name | Date |
|---|---|---|
| 259,029 | Marchant | June 6, 1882 |
| 796,231 | Lloyd | Aug. 1, 1905 |
| 1,289,439 | Glassford | Dec. 31, 1918 |
| 1,381,767 | Tracy | June 14, 1921 |
| 1,501,559 | Kaup | July 15, 1924 |
| 1,794,115 | Klaff | Feb. 24, 1931 |
| 1,897,727 | Hughes et al. | Feb. 14, 1933 |

FOREIGN PATENTS

| Number | Country | Date |
|---|---|---|
| 222,778 | Germany | June 4, 1910 |
| 551,685 | Germany | June 1, 1933 |